United States Patent
Nagai (10) Patent No.: US 10,688,827 B2
(45) Date of Patent: Jun. 23, 2020

(54) PNEUMATIC TIRE

(71) Applicant: TOYO TIRE & RUBBER CO., LTD., Itami-Shi, Hyogo (JP)

(72) Inventor: Kunihiko Nagai, Itami (JP)

(73) Assignee: TOYO TIRE CORPORATION, Itami-shi (JP)

( * ) Notice: Subject to any disclaimer, the term of this patent is extended or adjusted under 35 U.S.C. 154(b) by 489 days.

(21) Appl. No.: 15/654,788

(22) Filed: Jul. 20, 2017

(65) Prior Publication Data
US 2018/0029417 A1 Feb. 1, 2018

(30) Foreign Application Priority Data
Jul. 29, 2016 (JP) .................................. 2016-150225

(51) Int. Cl.
| B60C 11/00 | (2006.01) |
|---|---|
| B60C 19/08 | (2006.01) |
| B60C 1/00 | (2006.01) |
| B60C 19/00 | (2006.01) |

(Continued)

(52) U.S. Cl.
CPC ............ B60C 1/0008 (2013.01); B60C 5/007 (2013.01); B60C 11/005 (2013.01);
(Continued)

(58) Field of Classification Search
CPC .......................... B60C 19/082; B60C 11/0058
(Continued)

(56) References Cited

U.S. PATENT DOCUMENTS

| 4,683,928 A * | 8/1987 | Yahagi ................ B60C 11/00 |
|---|---|---|
| | | 152/209.5 |
| 2002/0062891 A1* | 5/2002 | Iwamura ............. B60C 11/01 |
| | | 152/209.16 |

(Continued)

FOREIGN PATENT DOCUMENTS

| EP | 2 551 129 B1 | 9/2014 |
|---|---|---|
| JP | 2007-290485 A | 11/2007 |

(Continued)

OTHER PUBLICATIONS

Machine translation of JP2007-290485 (no date).*

(Continued)

*Primary Examiner* — Steven D Maki
*Assistant Examiner* — Philip N Schwartz
(74) *Attorney, Agent, or Firm* — Westerman, Hattori, Daniels & Adrian, LLP (57) ABSTRACT

A tire has a cap rubber formed of nonconductive rubber and forms a ground surface, and a conductive portion provided in at least one side end portion of a pair of side end portions in both ends in a tire width direction. The conductive portion is formed of a conductive rubber, and reaches a side surface of the cap rubber from the ground surface through an inner portion of the cap rubber. The conductive portion is relatively small in a thickness in the ground surface and a side surface of the cap rubber, is relatively large in the maximum thickness of an intermediate portion between the ground surface and the side surface of the cap rubber, and is formed (Continued)

into a crescent shape which is curved into an outer side in a tire width direction and an outer side in a radial direction, in a tire meridian cross section.

5 Claims, 6 Drawing Sheets (51) Int. Cl.
  *B60C 5/00* (2006.01)
  *B60C 5/14* (2006.01)
  *B60C 11/01* (2006.01)
(52) U.S. Cl.
  CPC ............ *B60C 19/001* (2013.01); *B60C 19/08* (2013.01); *B60C 19/082* (2013.01); *B60C 1/0016* (2013.01); *B60C 5/14* (2013.01); *B60C 11/0058* (2013.01); *B60C 2001/0083* (2013.01); *B60C 2011/016* (2013.01)
(58) Field of Classification Search
  USPC .......................................... 152/152.1, DIG. 2
  See application file for complete search history.

(56) References Cited

U.S. PATENT DOCUMENTS

| 2013/0025753 A1* | 1/2013 | Nagai | ................... B60C 19/082 |
| | | | 152/152.1 |
| 2014/0367008 A1 | 12/2014 | Kawakami | |

FOREIGN PATENT DOCUMENTS

| JP | 2007290485 A * | 11/2007 | ............. B60C 11/00 |
| JP | 2013-95323 A | 5/2013 | |

OTHER PUBLICATIONS

Office Action dated Jan. 7, 2019, issued in counterpart DE application No. 10 2017 116 953.9, with English translation. (11 pages).
Office Action dated Jan. 11, 2019, issued in counterpart CN application No. 201710454813.1, with English translation. (14 pages).

* cited by examiner

PNEUMATIC TIRE

BACKGROUND OF THE INVENTION

Field of the Invention

The present disclosure relates to a pneumatic tire which can discharge static electricity generated in a vehicle body and the tire to a road surface.

Description of the Related Art

In recent years, for the purpose of reducing a rolling resistance of a tire which has strong relationship to a fuel consumption performance, there has been proposed a pneumatic tire in which a rubber member such as a tread rubber is formed by a non-conductive rubber blended with silica at a high rate. However, since an electric resistance is higher in the rubber member in comparison with a conventional product which is formed by a conductive rubber blended with carbon black at a high rate, and inhibits static electricity generated in a vehicle body or the tire from being discharged to a road surface, the rubber member has a problem that a problem such as a radio noise tends to be generated. Consequently, it is necessary to appropriately secure a conductive route for discharging the static electricity.

Then, there has been developed a pneumatic tire structured such that a current-carrying performance can be achieved by providing a conductive rubber where a carbon black is blended, while forming a tread rubber by a non-conductive rubber. For example, in a pneumatic tire described in JP-A-2013-95323, there is disclosed provision of a branched conductive portion extending to a side surface or a bottom surface of a cap rubber from a ground surface in both end portions in a tire width direction of the cap rubber formed by a nonconductive rubber. There is a description that not only a conductive path can be secured, but also an effect of reducing noise can be achieved by the conductive portion, according to the structure.

SUMMARY OF THE INVENTION

The present disclosure is made by taking the above circumstances into consideration, and an object of the present disclosure is to provide a pneumatic tire having a conductive portion which achieves other functions than the conductive path.

The present disclosure employs the following means for achieving the object.

In other words, according to the present disclosure, there is provided a pneumatic tire including a cap rubber which is formed of a nonconductive rubber and forms a ground surface and a conductive portion which is provided in at least one side end portion of a pair of side end portions in both ends in a tire width direction of the cap rubber. The conductive portion is formed of a conductive rubber, and reaches a side surface of the cap rubber from the ground surface through an inner portion of the cap rubber. The conductive portion is relatively small in a thickness in the ground surface and a side surface of the cap rubber, is relatively large in the maximum thickness of an intermediate portion between the ground surface and the side surface of the cap rubber, and is formed into a crescent shape which is curved into an outer side in a tire width direction and an outer side in a radial direction, in a tire meridian cross section.

According to the structure, since the conductive portion is formed into the crescent shape which is curved into the outer side in the tire width direction and the outer side in the radial direction, and is relatively large in the maximum thickness of the intermediate portion in comparison with the end portion, the deformation is suppressed in comparison with the case that the thickness is fixed, when the lateral force heading for the outer side in the tire width direction from the inner side in the tire width direction is applied. Since the strain is reduced by the suppression of the deformation, the durability is improved. Further, the rolling resistance is reduced by the suppression of the deformation caused by the lateral force. Further, since the conductive portion supports, the steering stability is improved.

DETAILED DESCRIPTION OF THE PREFERRED EMBODIMENTS

A description will be given below of a pneumatic tire according to an embodiment of the present disclosure with reference to the accompanying drawings.

Figure 1:
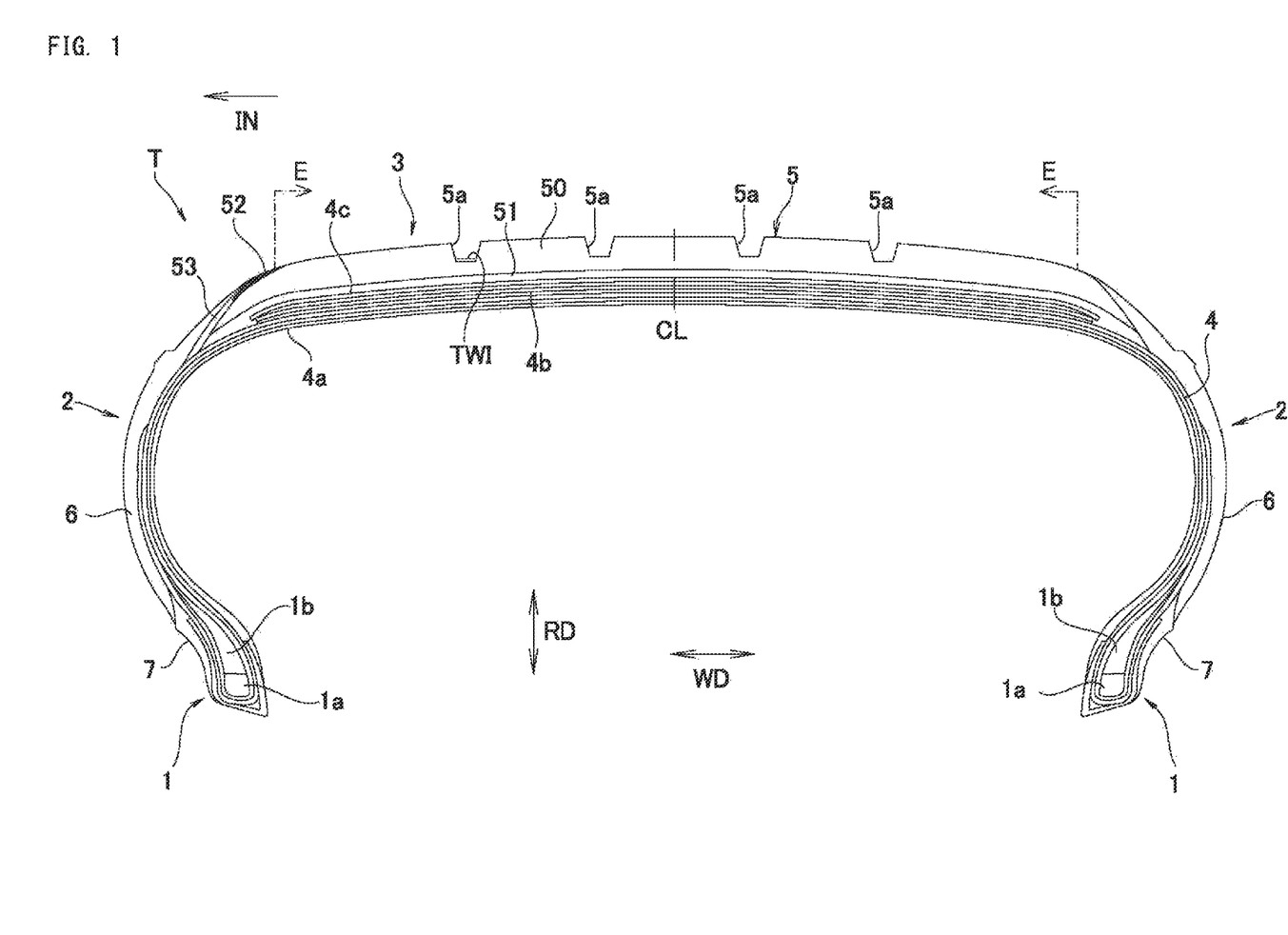
FIG. 1 is a tire meridian cross sectional view showing an example of a pneumatic tire according to the present disclosure.

As shown in FIG. 1, a pneumatic tire T is provided with a pair of bead portions 1, side wall portions 2 which extend to outer sides in a tire radial direction RD from the respective bead portions 1, and a tread portion 3 which is connected to outside ends in the tire radial direction RD from both the side wall portions 2. An annular bead core 1a and a bead filler 1b are arranged in the bead portion 1, the annular bead core 1a covering a convergence body such as a steel wire by a rubber, and the bead filler 1b being made of a hard rubber.

Further, the tire T is provided with a toroidal carcass layer 4 which runs into the bead portions 1 from the tread portion 3 via the side wall portions 2. The carcass layer 4 is provided between a pair of bead portions 1, is constructed by at least one carcass ply, and is locked in a state in which its end portions are rolled up via the bead cores 1a. The carcass ply is formed by coating with a topping rubber a cord which extends approximately vertically to a tire equator CL. An inner liner rubber 4a for retaining a pneumatic pressure is arranged in an inner side of the carcass layer 4.

Further, a side wall rubber 6 is provided in an outer side of the carcass layer 4 in the side wall portion 2. Further, a rim strip rubber 7 is provided in an outer side of the carcass layer 4 in the bead portion 1, the rim strip rubber 7 coming into contact with a rim (not shown) when being installed to the rim. In the present embodiment, the topping rubber of the carcass layer 4 and the rim strip rubber 7 are formed of a conductive rubber, and the side wall rubber 6 is formed of a nonconductive rubber.

An outer side of the carcass layer 4 in the tread portion 3 is provided with a belt 4b for reinforcing the carcass layer 4, a bet reinforcing member 4c, and a tread rubber 5 in this order from an inner side toward an outer side. The belt 4b is constructed by a plurality of belt plies. The belt reinforcing member 4b is constructed by coating a cord extending in a tire peripheral direction with a topping rubber. The belt reinforcing member 4b may be omitted as occasion demands.

Figure 2:
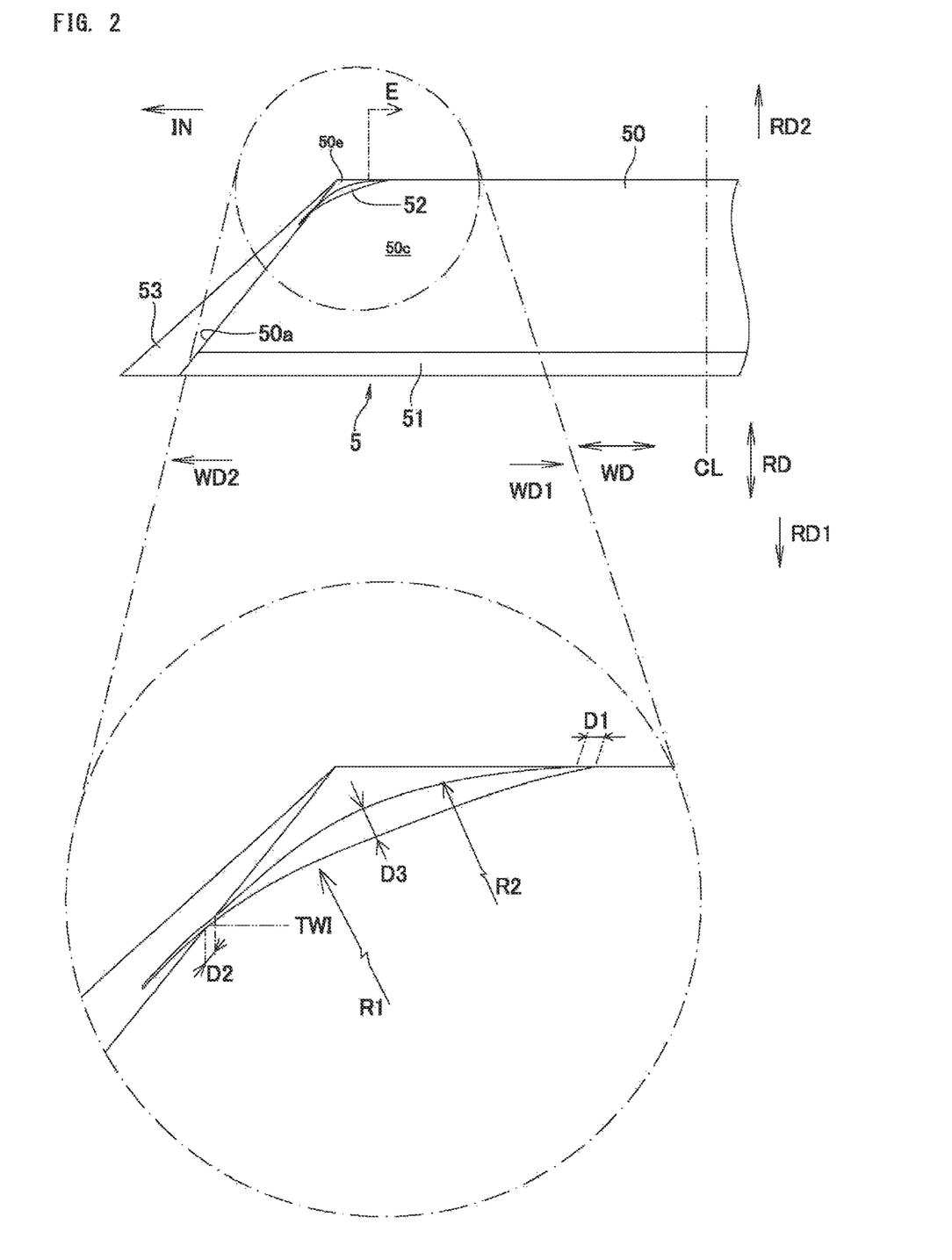
FIG. 2 is a cross sectional view schematically showing a tread rubber before being vulcanized.

As shown in FIGS. 1 and 2, the tread rubber 5 has a cap rubber 50 which is formed of the nonconductive rubber and constructs a ground surface E, abase rubber 51 which is provided in an inner side in a tire radial direction of the cap rubber 50, and a conductive portion 52 which is formed of the conductive rubber and reaches a side surface 50a of the cap rubber 50 from the ground surface E. A plurality of main grooves 5a extending along a tire circumferential direction are formed on a surface of the cap rubber 50. The main grooves 5a are provided with a Tread Wear Indicator (TWI) which is a projection protruding out of a groove bottom. The TWI indicates a tire replacement time due to wear of the tire. In the present embodiment, the base rubber 51 is formed of the conductive rubber, however, may be formed of the nonconductive rubber.

In the above, the ground surface is a surface which is grounded onto a road surface when the tire is vertically put on a flat road surface in a state in which the tire is assembled in a normal rim, and a normal internal pressure is filled, and a normal load is applied to the tire, and an outermost position in the tire width direction WD comes to a ground end E. The normal load and the normal internal pressure indicate a maximum load (a design normal load in the case of a tire for a passenger car) which is defined in JISD4202 (specification of an automotive tire) and a corresponding pneumatic pressure, and the normal rim indicates a standard rim which is defined in JISD4202 in principle.

The present embodiment employs a side-on tread structure achieved by mounting the side wall rubbers 6 onto both side end portions of the tread rubber 5, however, can employ a tread-on side structure achieved by mounting both side end portions of the tread rubber onto outer ends in the tire radial direction RD of the side wall rubbers, without being limited to the side-on tread structure.

Here, the conductive rubber is exemplified by a rubber in which a volume resistivity indicates a value less than $10^8$ Ω·cm, and is produced, for example, by blending a carbon black serving as a reinforcing agent in a raw material rubber at a high rate. The conductive rubber can be obtained by blending a known conductivity applying agent, for example, a carbon-based conductivity applying agent such as a carbon fiber or a graphite, and a metal-based conductivity applying agent such as a metal powder, a metal oxide, a metal flake or a metal fiber, in addition to the carbon black.

Further, the non-conductive rubber is exemplified by a rubber in which a volume resistivity indicates a value equal to or more than $10^8$ Ω·cm, and is exemplified by a material obtained by blending a silica serving as a reinforcing agent in the raw material rubber at a high rate. The silica is blended, for example, at 30 to 100 weight part in relation to 100 weight part of the raw material rubber component. The silica preferably employs a wet silica, however, can use any silica which is generally used as the reinforcing agent, without limitation. The non-conductive rubber may be produced by blending a burned clay, a hard clay, or a calcium carbonate, in addition to the silica such as a precipitated silica or a silicic anhydride.

As the raw material rubber mentioned above, a natural rubber, a styrene butadiene rubber (SBR), a butadiene rubber (BR), an isoprene rubber (IR) and an isobutylene-isoprene rubber (IIR) can be listed up, and they are used respectively by itself or by mixing two or more kinds. A vulcanizing agent, a vulcanization accelerator, a plasticizer or an anti-oxidant is appropriately blended in the raw material rubber.

In the light of enhancing a durability and improving a conduction performance, the conductive rubber desirably has a composition that a nitrogen adsorption specific surface area: $N_2SA$ (m$^2$/g)×composition amount (mass %) of carbon black is equal to or more than 1900, preferably equal to or more than 2000, and a dibutyl phthalate oil absorption: DBP (ml/100 g)×composition amount (mass %) of carbon black is equal to or more than 1500, preferably equal to or more than 1700. $N_2SA$ can be determined in conformity to ASTM D3037-89, and DBP can be determined in conformity to D2414-90.

FIG. 2 schematically shows the tread rubber 5 before being vulcanized. As shown in FIGS. 1 and 2, the conductive portion 52 is provided in at least one side end portion of a pair of side end portions in both sides in the tire width direction of the cap rubber 50. In the present embodiment, the conductive portion 52 is provided only in the side end portion which is an installation inner side (IN) to the vehicle. Of course, the conductive portion 52 may be provided in both of the installation inner side and an installation outer side, or may be provided only in the installation outer side. The conductive portion 52 is preferably provided at least in the installation inner side (IN). The installation inner side (IN) has larger load due to a camber angle in comparison with the installation outer side and tends to ground, so that an effect of the conductive portion 52 mentioned later tends to appear. A tire outer surface (particularly the side wall) is provided with a display which indicates an installing direction of the tire to the vehicle. The display "IN" is applied to the installation inner side to the vehicle, and the display "OUT" is applied to the installation outer side.

The conductive portion 52 is formed of the conductive rubber, and reaches the side surface 50a of the cap rubber 50 from the ground surface E through an inner portion of the cap rubber 50. The conductive portion 52 is relatively small in thicknesses D1 and D2 in the ground surface E and the side surface 50a of the cap rubber 50 and is relatively large in a thickness D3 of an intermediate portion between the ground surface E and the side surface 50a of the cap rubber 50, in a tire meridian cross section. The conductive portion 52 is formed into a crescent shape which is curved into an outer side WD2 in the tire width direction and an outer side RD2 in the radial direction, in the tire meridian cross section. The conductive portion 52 does not have any branched structure, but has one crescent shape.

Since the conductive portion 52 is formed into the crescent shape which is curved into the outer side WD2 in the tire width direction and the outer side RD2 in the radial direction and the maximum thickness of the intermediate portion is relatively large in comparison with the end portion, a deformation is suppressed in comparison with the case that the thickness is fixed, when a lateral force heading for the outer side WD2 in the tire width direction from an inner side WD1 in the tire width direction is applied. Since a strain is reduced by the suppression of the deformation, a durability is improved. Further, a rolling resistance is reduced by the suppression of the deformation caused by the lateral force. On the contrary, in the curved structure having the fixed thickness as JP-A-2013-95323, the conductive portion 52 is not supported and tends to be deformed. As a result, the structure is thought to have no effect of reducing the rolling resistance. Further, since the support by the conductive portion 52 is effected in the radial direction, a steering stability is improved.

Further, since the conductive portion 52 is relatively large in the thickness of the intermediate portion in comparison with the end portion, a width of the conductive portion 52 appearing on the road surface in the medium term of the wear becomes larger than that of a brand-new tire, and it is possible to improve a discharge effect.

Further, since the conductive portion 52 is formed into the curved shape, a contact area with the cap rubber 50 is increased in comparison with a linear shape, an adhesion property is improved and the durability can be improved.

In a particular shape, a relationship D1<D3 and D2<D3 is satisfied. A thickness D1 of the conductive portion 52 in the ground surface E is set to 0.1 to 0.5 mm. Since the thickness D1 is set to be equal to or more than 0.1 mm, a current-carrying performance can be easily secured. Further, since the thickness D1 is equal to or less than 0.5 mm, it is possible to better achieve the effect of reducing the rolling resistance and the effect of improving the wet braking performance by suppressing a volume of the conductive rubber.

The thickness D2 of the conductive portion 52 in the side surface 50a of the cap rubber 50 is set to 0.1 to 0.4 mm. Since the thickness D2 is equal to or more than 0.1 mm, the current-carrying performance can be easily secured. Further, since the thickness is equal to or less than 0.4 mm, it is possible to better achieve the effect of reducing the rolling resistance.

The maximum thickness D3 of the intermediate portion between the ground surface E and the side surface 50a of the cap rubber 50 is set to 0.6 to 1.5 mm. Since the maximum thickness D3 is equal to or more than 0.6 mm, the durability and the braking performance can be easily secured. Further, since the thickness is equal to or less than 1.5 mm, it is possible to better achieve the effect of reducing the rolling resistance and the effect of improving the wet braking performance. The maximum thickness D3 is a maximum value of thicknesses in a normal line direction in the inner side of the crescent shape.

Further, a relationship R1>R2 is satisfied in an average radius of curvature R1 in the inner side of the crescent shape, and an average radius of curvature R2 in the outer side of the crescent shape. In the present specification, "average radius of curvature" means a radius of curvature of a curved line in the case that the curved surface is constructed by a single curved line, and means an average value of the radii of curvature of curved lines in the case that the curved surface is constructed by a plurality of curved lines. In this shape, the average radius of curvature R1 is set to 5 to 45 mm, and the average radius of curvature R2 is set to 25 to 65 mm.

The position of the conductive portion 52 in the side surface 50a of the cap rubber 50 is essentially disposed on an imaginary extension of the TWI to the tire width direction or in an inner side in the radial direction than the imaginary extension for securing the current-carrying performance. Since the volume of the conductive portion 52 is increased by extending to the inner side in the radial direction too much, the position is preferably disposed on the imaginary extension for suppressing the volume of the conductive portion 52.

Figure 3:
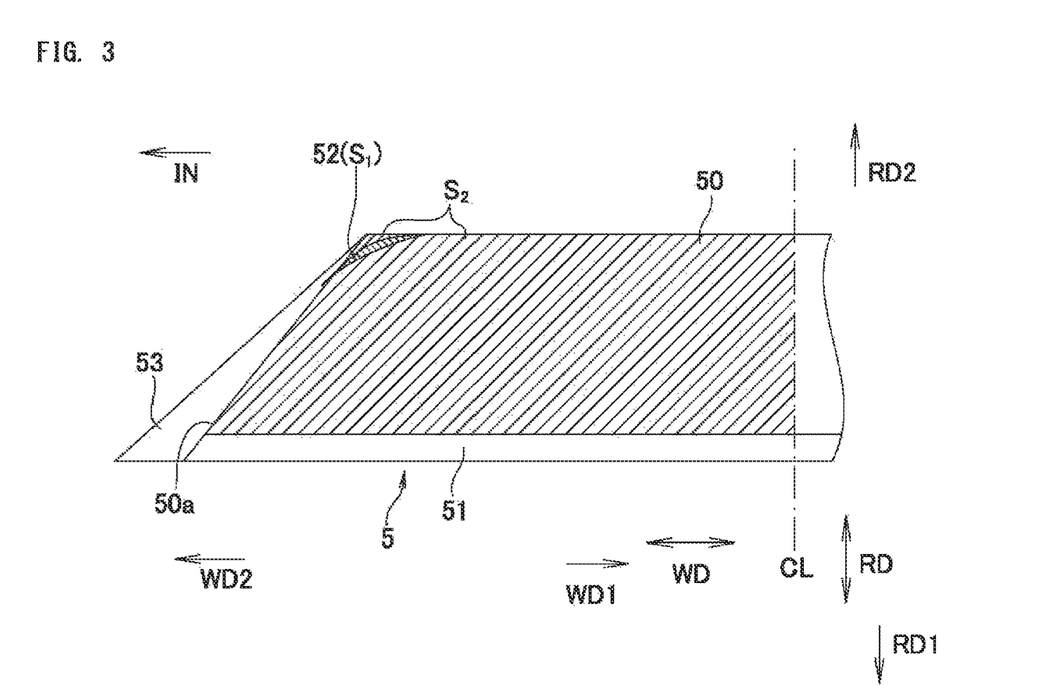
FIG. 3 is a cross sectional view schematically showing an area ratio between a cap rubber and a conductive portion before being vulcanized.

As shown in FIG. 3, in a half of the tire meridian cross section, a cross sectional area $S_1$ (a diagonally left-up hatching area in FIG. 3) of the conductive portion 52 existing in an inner portion of the cap rubber 50 has a relationship $(S_1+S_2)$: $S_1$=100:5 to 15 in relation to a total area $(S_1+S_2)$ of the cross sectional area $S_1$ and a cross sectional area $S_2$ (a diagonally right-up hatching area in FIG. 3) of the cap rubber 50. More specifically, the cross sectional area $S_1$ is equal to or more than 5% and equal to or less than 15% in relation to the total area $(S_1+S_2)$. Among them, 10% is preferable. If the total area is less than 5%, a machining performance is deteriorated, and if the total area goes beyond 15%, the volume of the conductive rubber is increased, and a motion performance and a wear resistance performance are significantly lowered. In the case that the conductive portion 52 enters into an inner portion of a strip rubber 53 mentioned later, the cross sectional area $S_1$ of the conductive portion 52 here does not include a portion entering into the strip rubber 53.

As shown in FIG. 1 and FIG. 2, the strip rubber 53 is provided for covering the side surface 50a of the cap rubber 50. The strip rubber 53 is formed of a rubber having a lower rubber hardness than the cap rubber 50. The strip rubber 53 does not form the ground surface E. The rubber hardness here means a hardness which is measured according to a durometer hardness test (type A) of JISK6253. The conductive portion 52 enters into an inner portion of the strip rubber 53. A side end portion of the cap rubber 50 forms a shoulder portion in a whole of the tire, and the shoulder portion tends to be deformed by an application of the load. The strip rubber 53 is lower in the rubber hardness than the cap rubber 50, and can enhance the adhesion property to the cap rubber 50 and the conductive portion 52 on the basis of softness of the strip rubber 53. Further, since the conductive portion 52 enters into the inner portion of the strip rubber 53, it is possible to enhance the adhesion property of each of the rubbers (the conductive portion 52, the strip rubber 53 and the cap rubber 50) in the shoulder portion. Particularly, since the conductive portion 52 is formed into the shape which is curved into the outer side WD2 in the tire width direction and the outer side RD2 in the radial direction, the conductive portion 52 is along the shape of the strip rubber 53, and is formed into a shape descending toward the outer side WD2 in the tire width direction. As a result, a catching effect on the strip rubber 53 tends to be generated. Therefore, the adhesion property is enhanced by the increase in the contact area and the catching. Further, since the strip rubber 53 does not come into contact with the road surface without forming the ground surface, it is possible to avoid reduction of endurance.

Further, as shown in FIG. 2, the cap rubber 50 is sectioned into a center side cap rubber 50c and an end side cap rubber 50e by the conductive portion 52. A rubber hardness $H_{50e}$ of the end side cap rubber 50e is equal to or lower than a rubber hardness $H_{50c}$ of the center side cap rubber 50c. The rubber hardness $H_{50e}$ is higher than a rubber hardness $H_{53}$ of the strip rubber 53. A relationship $H_{50c} \geq H_{50e} > H_{53}$ is established. Among them, a relationship $H_{50c} > H_{50e} > H_{53}$ is preferable. This is because a ground contact performance is increased and the steering stability is improved by the rubber hardness of the end side cap rubber 50e. Further, since the strain is reduced by the end side cap rubber 50e, the strain is absorbed in cooperation with the conductive portion 52, and the durability is improved.

Figure 4A:
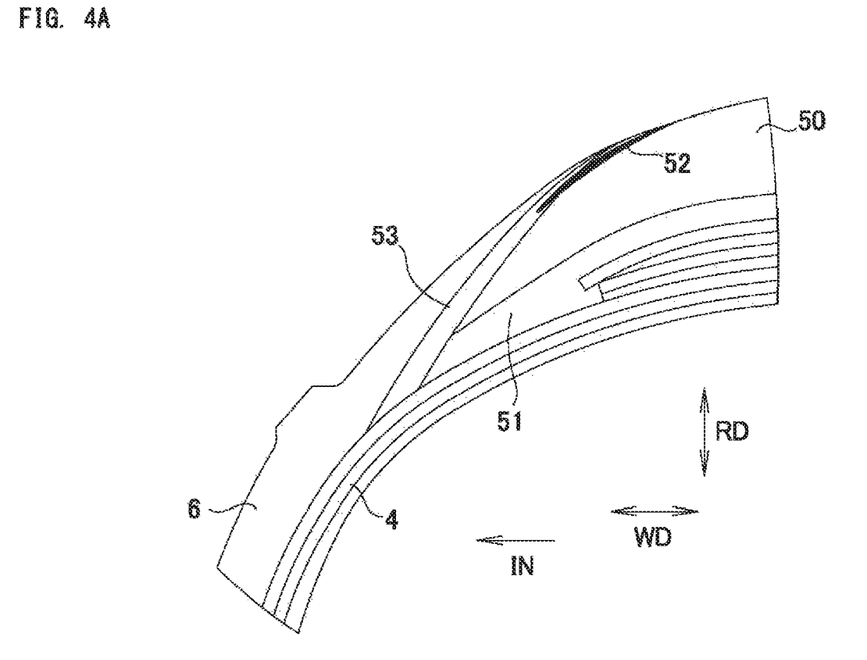
FIG. 4A is a cross sectional view showing a shoulder portion after being vulcanized.

In the present embodiment, the conductive portion 52 is terminated in the inner portion of the strip rubber 53 as shown in FIG. 4A. As mentioned above, according to the SWOT structure, the rubber volume of the conductive portion 52 can be reduced. In an example in FIG. 4A, it is necessary that the strip rubber 53 is formed of the conductive rubber for securing a conductive path. In addition, the side wall rubber 6, the carcass layer 4 and the base rubber 51 can appropriately employ any one of the conductive rubber and the nonconductive rubber. If the carcass layer 4 is made of the conductive rubber, the side wall rubber 6 can be made of the nonconductive rubber, and if the carcass layer 4 is made of the nonconductive rubber, the side wall rubber 6 may be made of the conductive rubber.

Figure 4B:
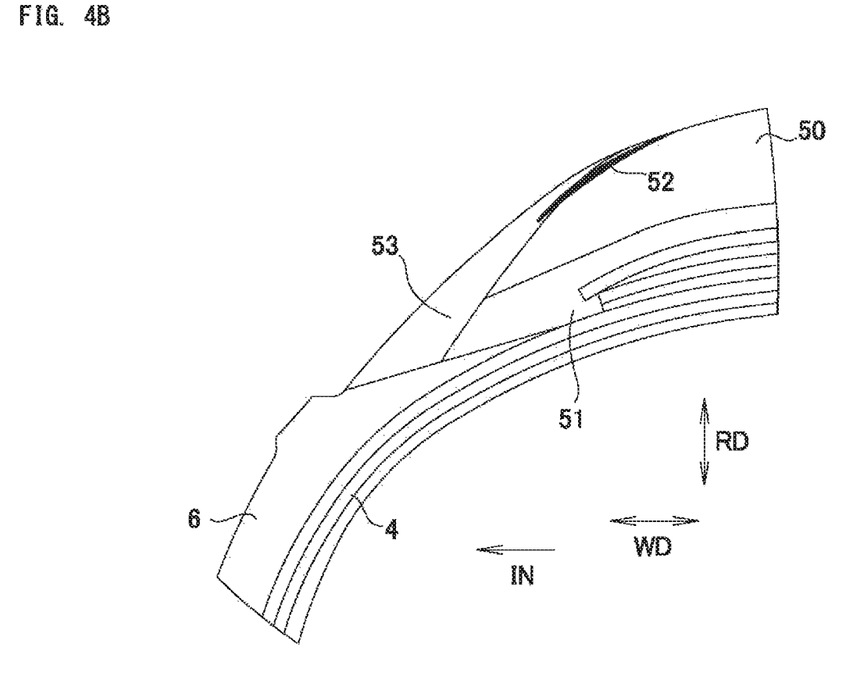
FIG. 4B is a cross sectional view showing a shoulder portion after being vulcanized according to the other embodiment.

Other Embodiments (1) As shown in FIG. 4B, the conductive portion 52 is terminated in the inner portion of the strip rubber 53 in the TOS structure. According to the TOS structure as mentioned above, it is possible to avoid deterioration of an outer appearance in comparison with the case that the conductive portion 52 passes through the strip rubber 53. In the example in FIG. 4B, it is necessary that the strip rubber 53 and the side wall rubber 6 are formed of the conductive rubber for securing the conductive path. The other elements can appropriately employ any one of the conductive rubber and the nonconductive rubber.

Figure 5A:
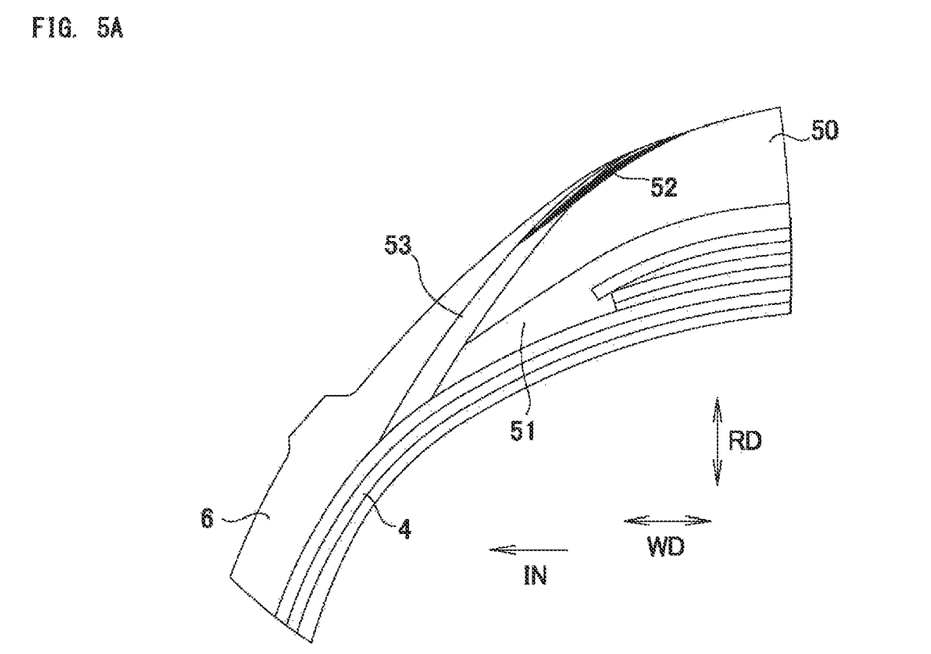
FIG. 5A is a cross sectional view showing a shoulder portion after being vulcanized according to the other embodiment than the above.

(2) As shown in FIG. 5A, the conductive portion 52 may pass through the strip rubber 53 and come into contact with the side wall rubber 6. In the example in FIG. 5A, the conductive path can be secured if the side wall rubber 6 is made of the conductive rubber. In the case that the side wall rubber 6 is made of the nonconductive rubber, the strip rubber 53 and the carcass layer 4 may be made of the conductive rubber.

Figure 5B:
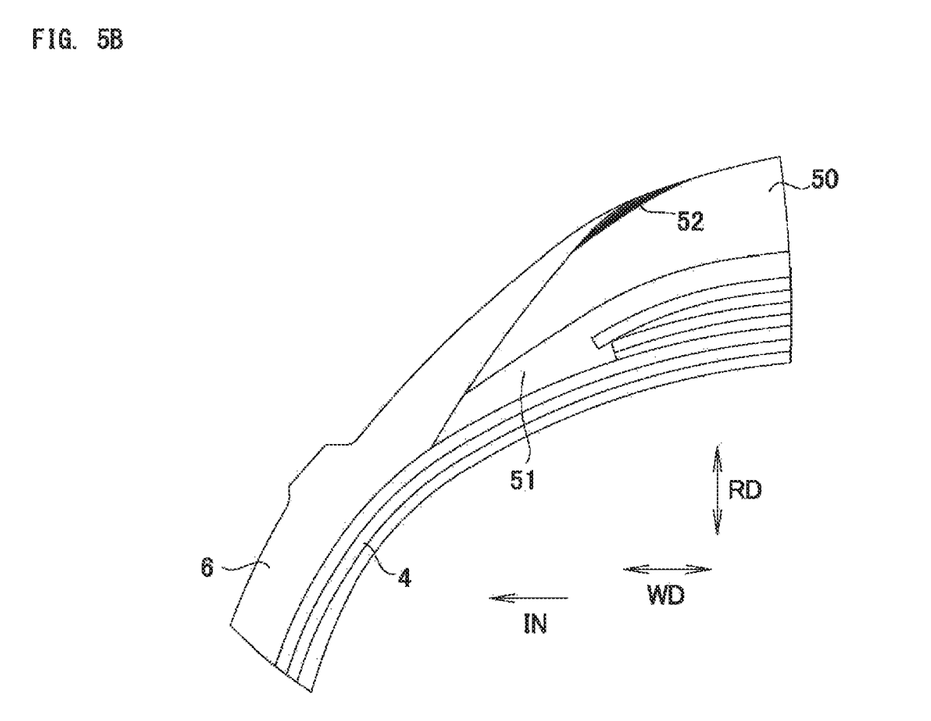
FIG. 5B is a cross sectional view showing a shoulder portion after being vulcanized according to the other embodiment than the above.

(3) As shown in FIG. 5B, the strip rubber 53 may not be provided. In this case, since the conductive portion 52 comes into contact with the side wall rubber 6, the conductive path can be secured if the side wall rubber 6 is made of the conductive rubber.

EXAMPLES

In order to specifically show the structures and the effects of the present disclosure, the following evaluations were made with regard to the following examples.

(1) Durability

A peeling force between the conductive portion 52 and the cap rubber 50 (nonconductive rubber) was measured. The measurement was carried out according to JISK-3:1999. A peeling property was compared. Results of evaluation of the peeling force was indicated by an index number obtained with a result in a comparative example 1 defined as 100. The greater the numerical value is, the higher the adhesion property is and the higher the endurance is.

(2) Steering Stability

Each of the tires, having a size 195/65R15 91H with an air pressure designated by a vehicle, was installed to a vehicle being a domestic sedan vehicle (2000 cc), and a steering stability was compared with sensory evaluation by traveling on a road surface. Evaluation was made by an index number obtained with a result in the comparative example 1 defined as 100, indicating that the greater the index number is, the more excellent the steering stability is.

(3) Rolling Resistance

A rolling resistance was measured according to International Standard ISO28580 (JIS D4234). Evaluation was made by an index number obtained with a result of the comparative example 1 defined as 100, indicating that the smaller the index number is, the lower the rolling resistance is, and the more excellent the rolling resistance is.

Comparative Example 1

Figure 6A:
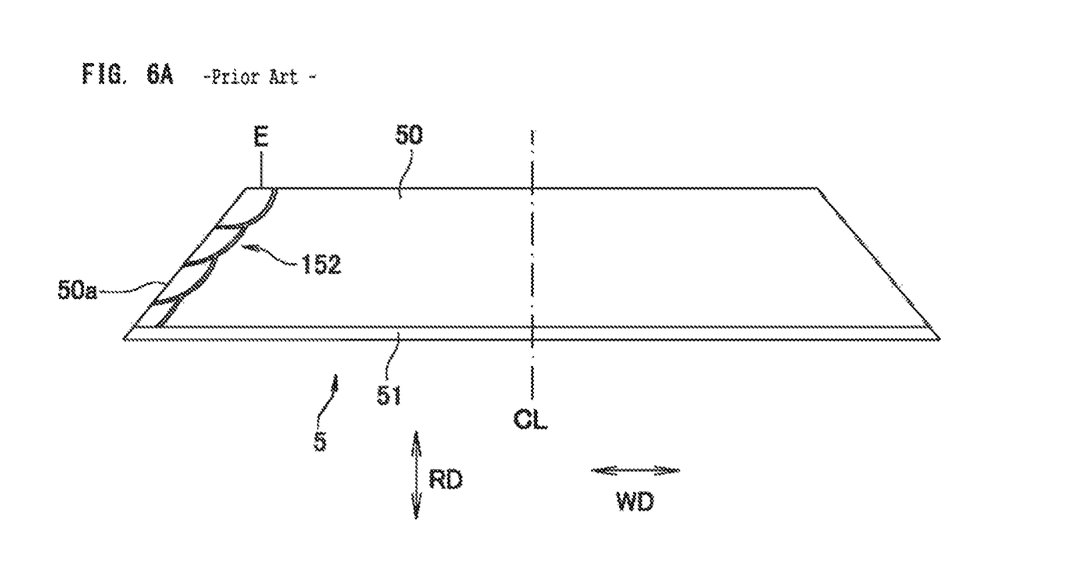
FIG. 6A is a cross sectional view schematically showing a tread rubber before being vulcanized according to a comparative example 1.

As shown in JP-A-2013-95323 and FIG. 6A, there was provided a curved conductive portion 152 which reached the side surface 50a of the cap rubber 50 from the ground surface E. Four conductive portions 152 are connected in the tire radial direction. The thickness of the conductive portion 152 is fixed. The other structures of the comparative example 1 were formed same as the example 1.

Comparative Example 2

Figure 6B:
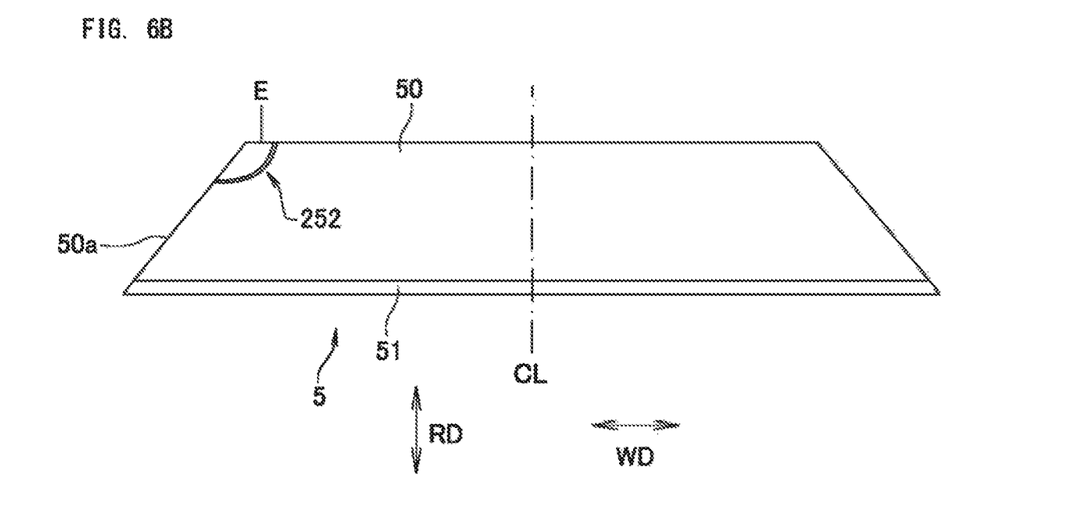
FIG. 6B is a cross sectional view schematically showing a tread rubber before being vulcanized according to a comparative example 2.

As shown in FIG. 6B, there was provided a conductive portion 252 in which the number of the curved portions in FIG. 6A was set to one. The thickness of the conductive portion 252 is fixed. The other structures of the comparative example 2 were formed same as the example 1.

Example 1

As shown in FIG. 2, the conductive portion 52 was provided. The conductive portion 52 is structured such that the thicknesses in the ground surface and the side surface of the cap rubber are relatively small and the maximum thickness of the intermediate portion between the ground surface and the side surface of the cap rubber is relatively large, and is formed into the crescent shape which is curved into the outer side in the tire width direction and the outer side in the radial direction, in the tire meridian cross section.

TABLE 1

|  | Comparative Example 1 | Comparative example 2 | Example 1 |
| --- | --- | --- | --- |
| Structure | FIG. 6A | FIG. 6B | FIG. 2 |
| Thickness of conductive part | Fixed | Fixed | Thickness of center portion: large Thickness of both end portions: small |
| Durability | 100 | 105 | 110 |
| Steering stability | 100 | 103 | 110 |
| Rolling resistance | 100 | 95 | 90 |

According to Table 1, it is known that the example 1 is more excellent than the comparative examples 1 and 2 in all of the durability, the steering stability and the rolling resistance.

The durability is improved in the comparative example 2 in comparison with the comparative example 1 because it is considered that the comparative example 1 has four curved conductive portions but the comparative example 2 has one curved conductive portion, so that the volume of the conductive portion is reduced. The example 1 is improved in comparison with the comparative example 2 because it is considered that the volume is not changed by the thickness change so much in comparison with the fixed thickness, however, the contact area of an interface between the cap rubber and the conductive rubber is increased.

The following reason can be considered as the other reasons than the increase in the contact area. The fixed thickness does not have an effect of suppressing the deformation in grounding, however, the deformation in grounding can be suppressed and the rolling resistance can be reduced by the crescent shape which is thick in the center portion and is thin in both ends. The volume of the conductive rubber is increased and the rolling resistance is deteriorated by the increase of the thickness in the center portion in the example 1 in comparison with the comparative example 2, however, it is considered that the reduction in the rolling resistance due to the deformation suppression sufficiently exceeds the deterioration of the rolling resistance.

With regard to the steering stability, it is considered that the steering stability is improved in the example 1 since the deformation is suppressed in the example 1 in comparison with the comparative examples 1 and 2 when the lateral force heading for the outer side WD2 in the tire width direction from the inner side WD1 in the tire width direction is applied.

The rolling resistance is reduced in the comparative example 2 in comparison with the comparative example 1 because it is considered that the volume of the conductive portion is reduced. The rolling resistance is further reduced in the example 1 in comparison with the comparative example 2 because of the following reason. The effect of suppressing the deformation in grounding is not obtained in the case that the thickness is fixed, however, the deformation in grounding can be suppressed and the strain becomes smaller by the crescent shape which is thick in the center portion and thin in both ends. As a result, it is considered that the rolling resistance is reduced. The volume of the conductive rubber is somewhat increased by the increase of the thickness in the center portion in the example 1 in comparison with the comparative example 2, however, the reducing amount of the rolling resistance on the basis of the shape sufficiently exceeds the volume increase.

As mentioned above, the pneumatic tire according to the present embodiment has a cap rubber 50 which is formed of a nonconductive rubber and forms a ground surface E, and a conductive portion 52 which is provided in at least one side end portion of a pair of side end portions in both ends in a tire width direction of the cap rubber 50. The conductive portion 52 is formed of a conductive rubber, and reaches a side surface 50a of the cap rubber 50 from the ground surface E through an inner portion of the cap rubber 50. The conductive portion 52 is relatively small in a thickness D1 and D2 in the ground surface E and a side surface 50a of the cap rubber 50, is relatively large in the maximum thickness D3 of an intermediate portion between the ground surface E and the side surface 50a of the cap rubber 50. The conductive portion 52 is formed into a crescent shape which is curved into an outer side WD2 in a tire width direction and an outer side RD2 in a radial direction, in a tire meridian cross section.

According to the structure, since the conductive portion 52 is formed into the crescent shape which is curved into the outer side WD2 in the tire width direction and the outer side RD2 in the radial direction, and is relatively large in the maximum thickness of the intermediate portion in comparison with the end portion, the deformation extending in the tire radial direction is suppressed in comparison with the case that the thickness is fixed, when the lateral force heading for the outer side in the tire width direction from the inner side in the tire width direction is applied. Since the strain is reduced by the suppression of the deformation, the durability is improved. Further, the rolling resistance is reduced by the suppression of the deformation caused by the lateral force. Further, since the conductive portion 52 supports, the steering stability is improved.

According to the present embodiment, a cross sectional area $S_1$ of the conductive portion is equal to or more than 5% and equal to or less than 15% in relation to a total area $(S_1+S_2)$ of a cross sectional area $S_1$ of the conductive portion existing in the inner portion of the cap rubber and a cross sectional area $S_2$ of the cap rubber, in a half of the tire meridian cross section.

According to the structure, it is possible to further secure the machining performance, the motion performance and the wear resistance performance.

According to the present embodiment. The tire has a strip rubber 53 which covers a side surface 50a of the cap rubber 50. The strip rubber 53 is formed by a rubber which has a lower rubber hardness than the cap rubber 50, and does not form any ground surface E. The conductive portion 52 enters into an inner portion of the strip rubber 53.

According to the structure, since the strip rubber 53 is a soft rubber having a lower rubber hardness than the cap rubber 50, the adhesion property between the cap rubber 50 and the conductive portion 52 is enhanced on the basis of the softness even in the shoulder portion to which the load tends to be applied, and it is possible to improve the endurance. Since the conductive portion 52 enters into the inner portion of the strip rubber 53, it is also possible to enhance the adhesion property of each of the rubbers in the shoulder portion and improve the endurance. Further, since the strip rubber 53 does not form the ground surface E or come into contact with the road surface in spite of the lower rubber hardness than the cap rubber 50, it is possible to avoid the deterioration of the endurance.

According to the present embodiment, the cap rubber 50 is sectioned into a center side cap rubber 50c and an end side cap rubber 50e by the conductive portion. The rubber hardness of the end side cap rubber 50e is lower than the rubber hardness of the center side cap rubber 50c and is higher than the rubber hardness of the strip rubber 53.

According to the structure, the ground contact performance is increased by the rubber hardness of the end side cap rubber 50e, and the braking performance is improved. Further, since the end side cap rubber 50e and the conductive portion 52 cooperate and absorb the strain, the durability is improved.

According to the present embodiment, the conductive portion 52 is terminated in the inner portion of the strip rubber 53.

According to the structure, the outer appearance is not deteriorated in the TOS structure and the rubber volume can be reduced in the SWOT structure.

According to the present embodiment, a display indicating an installing direction of the tire to a vehicle is provided on an outer surface of the tire. The conductive portion 52 is provided at least in the side end portion which comes to an installation inner side to the vehicle.

According to the structure, the load tends to be applied to installation inner side in comparison with the installation outer side by setting the camber angle, and the above effect becomes higher in comparison with the case that the conductive portion 52 is provided only in the installation outer side.

The tread rubber 5 having the conductive portion 52 mentioned above can be obtained easily by an extrusion molding method. In the extrusion molding method, the tread rubber having a predetermined cross sectional shape is formed into a band shape by a coextrusion of the cap rubber

50, the base rubber 51 and the conductive portion 52, and the annular tread rubber 5 is formed by jointing the end portions to each other.

It is possible to apply the structure employed in each of the embodiments to the other optional embodiment. The particular structure of each of the portions is not limited to the embodiments mentioned above, but can be variously modified within a range which does not deviate from the scope of the present invention.

What is claimed is:

1. A pneumatic tire comprising:
    a cap rubber which is formed of a nonconductive rubber and forms a ground surface;
    a conductive portion which is provided in at least one side end portion of a pair of side end portions in both ends in a tire width direction of the cap rubber, and
    a strip rubber which covers a side surface of the cap rubber,
    wherein the conductive portion is formed of a conductive rubber, and reaches a side surface of the cap rubber from the ground surface through an inner portion of the cap rubber,
    the conductive portion is relatively small in a thickness in the ground surface and a side surface of the cap rubber, is relatively large in the maximum thickness of an intermediate portion between the ground surface and the side surface of the cap rubber, and is formed into a crescent shape which is curved into an outer side in a tire width direction and an outer side in a radial direction, in a tire meridian cross section,
    the strip rubber is formed by a conductive rubber which has a lower rubber hardness than the cap rubber, and does not form any ground surface, and
    the conductive portion enters into an inner portion of the strip rubber.

2. The pneumatic tire according to claim 1, wherein a cross sectional area $S_1$ of the conductive portion is equal to or more than 5% and equal to or less than 15% in relation to a total area $(S_1+S_2)$ of a cross sectional area $S_1$ of the conductive portion existing in the inner portion of the cap rubber and a cross sectional area $S_2$ of the cap rubber, in a half of the tire meridian cross section.

3. The pneumatic tire according to claim 1, wherein the cap rubber is sectioned into a center side cap rubber and an end side cap rubber by the conductive portion, and
    wherein the rubber hardness of the end side cap rubber is lower than the rubber hardness of the center side cap rubber and is higher than the rubber hardness of the strip rubber.

4. The pneumatic tire according to claim 1, wherein the conductive portion is terminated in the inner portion of the strip rubber.

5. The pneumatic tire according to claim 1, wherein a display indicating an installing direction of the tire to a vehicle is provided on an outer surface of the tire, and
    wherein the conductive portion is provided at least in the side end portion which comes to an installation inner side to the vehicle.

* * * * *